April 5, 1932. A. H. TROTTER 1,852,763
PROCESS AND APPARATUS FOR THE TREATMENT OF GASES UNDER PRESSURE
Filed May 24, 1929
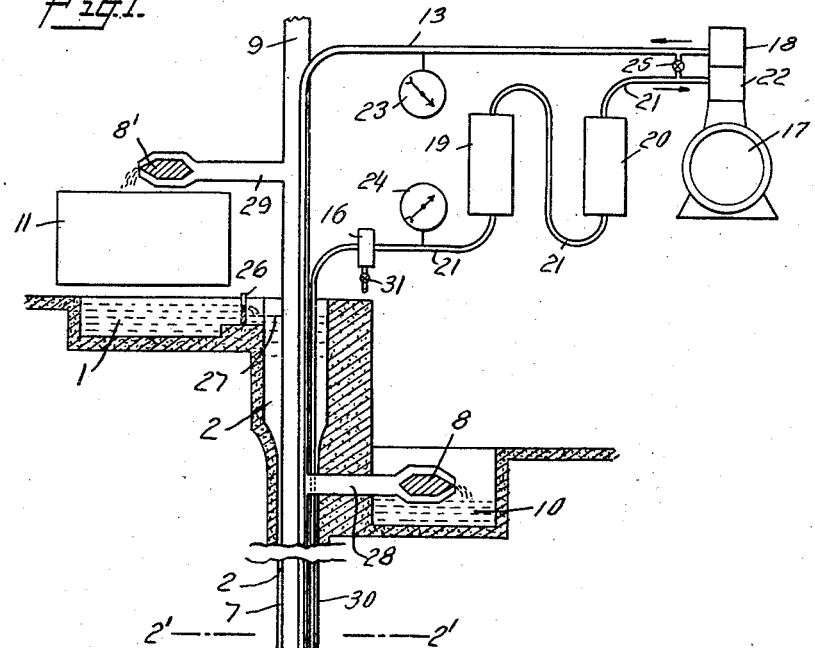
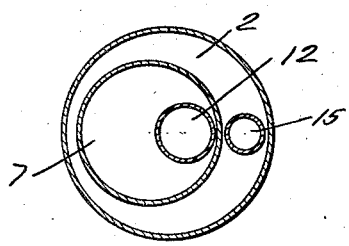
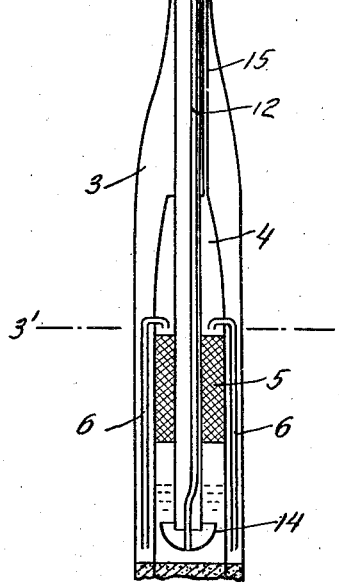
INVENTOR
A. H. Trotter
BY
ATTORNEY Patented Apr. 5, 1932

1,852,763

UNITED STATES PATENT OFFICE

ARTHUR H. TROTTER, OF SYRACUSE, NEW YORK, ASSIGNOR TO ATMOSPHERIC NITROGEN CORPORATION, OF NEW YORK, N. Y., A CORPORATION OF NEW YORK

PROCESS AND APPARATUS FOR THE TREATMENT OF GASES UNDER PRESSURE

Application filed May 24, 1929. Serial No. 365,705.

My invention relates to a process and apparatus for the treatment of gas under pressure with a liquid. More particularly my invention relates to the treatment of nitrogen-hydrogen gas mixtures containing carbon dioxide as an impurity with water to absorb the carbon dioxide, while maintaining the nitrogen-hydrogen gas under a pressure greatly above atmospheric.

In connection with the treatment of gases with a liquid, it is often desirable to carry out such treatment under pressures greatly above atmospheric. The removal of carbon dioxide from admixture with a nitrogen-hydrogen gas to be used for the synthetic production of ammonia is one example of such a process of gas treatment. As generally carried out, this process comprises passing the gaseous mixture containing nitrogen, hydrogen and carbon dioxide under a relatively high pressure of for example, about 10 atmospheres or above, through a tower countercurrent to a flow of water passing over packing material contained in the tower. Carbon dioxide is dissolved by the water and the water containing the dissolved $CO_2$ is withdrawn from the tower separate from the purified gas. The water required for the solution of the carbon dioxide is injected into the tower against the high pressure of the gas therein and this has heretofore required the expenditure of large quantities of energy and the employment of expensive pumping machinery. Attempts have been made to recover the energy contained in the water solution of $CO_2$ leaving the tower, and return it for use in injecting fresh quantities of water, but it is possible to recover only a portion of the energy expended in pumping the water into the tower and this partial recovery necessitates costly machines and equipment.

The object of my invention is to provide an economical process for treating a gas under pressure and means therefor in which the pumps heretofore used for introducing the liquid into the vessel containing the gas under pressure and the expenditure of large amounts of energy to operate these pumps are no longer necessary. Likewise, my invention contemplates elimination of the costly means for effecting partial recovery of the energy expended in the operation of the pumps, as heretofore required.

My invention will be particularly described in connection with the purification of a nitrogen-hydrogen gas mixture containing carbon dioxide, preparatory to employing the purified gas for the synthetic production of ammonia.

In the accompanying drawings, Fig. 1 is a sectional elevation of an apparatus embodying my invention, and Fig. 2 is a cross section of the apparatus shown in Fig. 1 taken along line 2'—2'.

In Fig. 1, the numeral 1 designates a source of water to be employed in scrubbing a gas. A bore hole 30 extends in a downward direction into the earth, forming a liquid inlet channel 2, and is enlarged at the bottom to form a chamber 3. The bore hole has a predetermined vertical projection such that when it is filled to approximately the ground level with the liquid with which the gas is to be treated, the bottom portion of the column of liquid, i. e., the liquid in chamber 3 at level 3' is under a hydrostatic pressure greater than the pressure of the gas. For example, if a gas under a pressure of 30 atmospheres is to be treated with water, bore hole 2 will have a vertical projection of about 1200 feet. A gate 26 is provided to control the rate of flow of water from source 1 to channel 2 and the position of the water level 27 when the apparatus is in operation. The bore hole is lined with a material which prevents the escape of water to the surrounding earth, as for example, cast iron or reinforced concrete pipe. A fluid-tight vessel 4 is provided in chamber 3. Vessel 4 contains a packing 5 whereby a liquid and gas passing through the vessel are brought into effective contact with each other. One or more open tubes or liquid inlet pipes 6 pass from near the bottom of chamber 3 through the wall of vessel 4, and terminate within the upper portion of the vessel above the packing 5. A liquid exit conduit 7 transverses inlet channel 2 and extends upwardly to substantially the ground level. Conduit 7 enters the top of vessel 4, passes downward through the packing 5 and terminates in the lower portion of the vessel, a short distance above the bottom. Fluid outlets 8 and 8' are connected to the upper portion of the conduit by outlet branches 28 and 29 respectively, branch 28 and outlet 8 being positioned sufficiently below level 27 that the distance between level 27 and the outlets of pipes 6 in vessel 4 is greater than the distance between branch 28 and outlet 8 and the desired level of water in vessel 4 during operation of the apparatus. An extended top portion 9 of conduit 7 is open to the atmosphere and serves as a gas stack. Liquid leaving the outlets 8 and 8' may be wasted to a canal 10, or may be passed into a receiving vessel 11 where it is regenerated for reuse.

Within conduit 7 is a gas inlet pipe 12 which connects at its upper end with pipe 13 and at its lower end extends out of the open bottom of conduit 7 and terminates in a gas distributing umbrella 14. The upturned edges of umbrella 14 encircle the bottom of conduit 7 to prevent gas from pipe 12 entering conduit 7 during operation of the apparatus. From the top of vessel 4 a gas outlet pipe 15 passes upward through channel 2 and connects with a separator 16, provided with a valved drip pipe 31, for removing from the gas entrained moisture.

A multi-stage gas compressor 17 serves to compress a nitrogen-hydrogen gas mixture containing $CO_2$ entering cylinder 18 to a pressure of for example about 30 atmospheres and pass it through pipe 13 to pipe 12. Gas from pipe 15, after passing through separator 16, is conducted by pipe 21 through purification vessels 19 and 20 to a high pressure cylinder 22 of compressor 17 where it is brought to a higher pressure for further treatment in the process of synthesizing ammonia from the nitrogen and hydrogen of the gas. Pressure gauges 23 and 24 are provided in pipes 13 and 21, and a by-pass valve 25 connects these two pipes.

The method of practicing the process of my invention employing the apparatus described, is as follows: Channel 2, pipes 6, vessel 4, conduit 7, and pipes 12 and 15 are filled with water from source 1. Level 27 is at such a vertical height above the openings of pipes 6 into vessel 4 that the water pressure head between level 27 and the openings of pipe 6 is equal to the water pressure between the desired water level in vessel 4 and in exit conduit 7, when the apparatus is in operation, plus an amount sufficient to overcome the friction loss when water is circulating through vessel 4 at the desired rate.

Nozzle 8 is opened and a flow of the confined column of water is started down the channel 2, through inlet pipes 6 into vessel 4, through this vessel and conduit 7 and out through outlet branch 28 and nozzle 8. This flow is maintained by adjusting gate 26 to allow water to flow from source 1 to maintain level 27. The water level inside the pipes 12 and 15 will be between the levels in channel 2 and conduit 7. With by-pass 25 and the valve in drip pipe 31 open, compressor 17 is started up. The valve in drip pipe 31 is then closed and the gas pressure in the system, as recorded by gauges 23 and 24, will start to build up, and the water level inside pipes 12 and 15 will be depressed until gas enters the top of vessel 4. As the pressure continues to build up, the level of water in vessel 4 will be depressed until it is below the openings of pipes 6. During this time the flow of water through the apparatus continues and will continue until the level is still further depressed to a point where the head between level 27 and the openings of pipes 6 in vessel 4 is equal to the head between the water level in the vessel and that in the exit conduit 7. At this point the flow of water will stop and the pressure at which the water flow stops should be marked on gauge 24 as a control point showing the pressure in 21 which must not be exceeded if a flow of water through vessel 4 is to be assured. The working pressure to be maintained in 21 as shown by gauge 24 should, of course, be less than this by the amount necessary to overcome the friction loss when the water is circulating through the vessel 4 at the desired rate. By-pass 25 is then closed and the pressure in the gas inlet pipe 12 will rapidly build up and force the last of the water out of the lower end of the pipe. Gas will follow and bubble out around umbrella 14. When the pressure shown on gauge 23 stops rising, the gas will have started to bubble out at the lower end of pipe 12. In order to again start a flow of water through the apparatus so that the water at the bottom of the confined column in channel 2 is under a hydrostatic pressure greater than the pressure in vessel 4 and will pass into the vessel in regulated quantities, the pressure in 21 is adjusted to sufficiently below the control pressure to cause the desired rate of circulation of the water and the vertical projection of the column of water in channel 2 is maintained by supplying water from source 1 to the top of the column. The gas enters vessel 4 around umbrella 14, rises through packing 5 where it is brought into effective contact with and scrubbed by the descending flow of water and then is withdrawn through exit pipe 15 to separator 16 Here water entrained by the gas as a spray or mist is separated out, and the gas passes through vessels 19 and 20 where it undergoes such purification as is desirable. From vessel 20 the purified gas is brought to a higher pressure in cylinder 22 of compressor 17, and it may then be passed into an ammonia synthesis system.

The water passing through vessel 4 becomes charged with $CO_2$ gas and this solution is withdrawn from the vessel to the bottom portion of the column of liquid in conduit 7 which is of such a vertical projection that the bottom portion is under a hydrostatic pressure less than but approximately the pressure within the vessel. The solution rising in conduit 7 will give off $CO_2$ gas as the pressure upon the liquid drops with approach to the surface level of the water in the conduit. The evolution of this gas will lighten the column of liquid in the conduit and tend to induce a drop in the pressure in vessel 4 and pipe 21 as indicated by gauge 24. To counteract this tendency, valve 8 is closed sufficiently to cause the water level in conduit 7 to rise to a point at which the desired operating pressure as indicated by gauge 24 is maintained, or valve 8 may be completely closed and the water pass from conduit 7 at a higher level, for example through valve 8'.

The operation of my apparatus once started as described above, continues as long as is desired; water from source 1 maintains the column of liquid in channel 2 and passes down through channel 2 and pipes 6 into vessel 4 in regulated quantities where it is brought into effective contact with the gas under pressure entering the vessel through pipes 13 and 12 and leaving through pipes 15 and 21. The water, now carrying $CO_2$ in solution, passes in regulated quantities from vessel 4 to the bottom of the liquid column in conduit 7 and corresponding quantities of water are withdrawn from the top of the column.

The quantity of water passing through vessel 4 may be controlled by either of two methods or by a combination of both. With a given gas pressure within vessel 4, the rate of flow of the water to the vessel may be adjusted by varying the height of level 27 and the rate of removal of liquid from the vessel may be adjusted by varying the height of the liquid level in conduit 7. For making minor changes in the amount of water passing through vessel 4 while maintaining level 27 and the liquid level in conduit 7 at a given position, the rate of flow of water may be adjusted by varying the pressure of the gas as indicated on gauge 24.

The difference between the pressures indicated by gauges 23 and 24 is a measure of the water head in vessel 4 above the open end of inlet pipe 12. The water level in the scrubber once fixed as described above, tends to remain at that point, since any rise in scrubber water level shortens the effective column of water in conduit 7 (the distance between the liquid levels in the upper portion of conduit 7 and in vessel 4) and thus tends to increase the rate of flow through the conduit and counteract the rise in water level. A fall in level in the vessel lengthens the effective column of water in conduit 7, and thus tends to decrease the rate of flow through the conduit and counteract the fall in water level.

The $CO_2$ gas evolved from the column of water in conduit 7 passes off from the surface of the water and is discharged through the upward extension of the conduit either to the atmosphere, to storage, or any other desired point. If it is desired to use the water from which the gas has been evolved over again, it may be returned from canal 10 to source 1, or the water in conduit 7 may be discharged through branch pipe 29 and nozzle 8' directly to a vessel 11 for treatment to more completely eliminate dissolved $CO_2$, and the treated water passed from vessel 11 to source 1.

It is apparent that a given apparatus of the type described will be designed for operation at a given pressure of gas in vessel 4. For example, the vertical projection of the bore hole is determined by the pressure of the gas to be treated and the specific gravity of the liquid used. The length must be such that when filled to the upper level 27, a confined column of liquid is established of such a vertical projection that a portion of the liquid in chamber 3, (as at the level 3' in the above described installation), is under a hydrostatic pressure greater than the pressure of the gas within vessel 4 to be treated with the liquid. The pressure in the vessel as recorded by gauge 24 at which liquid will cease to flow, is dependent upon the vertical projection of the column of liquid between the outlet of pipes 6 in the vessel and the liquid level 27. Likewise, the effective length of the column of liquid maintained in conduit 7 is determined by the operating pressure in vessel 4. The vertical projection of this column is such that its bottom portion is under a hydrostatic pressure less than but substantially equal to the pressure within vessel 4. The extent of the permissible variations in the pressure of the gas in the vessel is determined by the provision made for adjusting the level 27 and the liquid level in conduit 7.

By positioning vessel 4 within chamber 3, surrounding it with water under substantially the same pressure as exists within the vessel, the construction of the vessel is much simplified and made more inexpensive than if it were necessary to build it to operate under an external pressure greatly less than the internal pressure. If, however, it be considered undesirable to fill the bore hole with water as shown, a liquid inlet conduit, independent of the bore hole, may be provided communicating at the top with the source of water and at the bottom with vessel 4 by way of an arrangement functioning in the same way as pipes 6.

In accordance with my invention, a supply of liquid which may be available at the ground level, may be placed under a high pressure and introduced into a vessel wherein it is employed for the treatment of a gas, without necessitating the expenditure of large amounts of energy. Furthermore, the liquid which has been contacted with the gas may be removed from the vessel and be returned to substantially the level of the supply of liquid and there be wasted to a drain or employed in any desired manner without the installation of costly pumps and expenditure of energy for their operation. When the exit liquid contains a dissolved gas as impurity which is evolved from solution by a decrease in pressure, it may be returned to a level above that from which it was passed to the vessel under pressure and after treatment to regenerate it, may be recirculated into the vessel without the use of a circulating pump. This advantage, inherent in my invention, is of particular importance when the regeneration of the liquid necessitates relieving the pressure in order to evolve the gas absorbed therein.

While my invention has been particularly described in connection with an apparatus suitable for removing carbon dioxide from a nitrogen-hydrogen gas to be used for the synthetic production of ammonia, it may be employed for other processes wherein a gas under high pressure is treated with a liquid.

It is evident that various modifications in the process and apparatus described and illustrated may be made. For example, the channel 2 for the inlet water may contain a valve for positively controlling the rate of flow of water to vessel 4 rather than by adjustment of the vertical projection of the liquid column in channel 2 by varying the pressure in vessel 4. The source of water may comprise a closed conduit containing water under pressure and this closed conduit may be connected with the top of the inlet channel by a fluid-tight connection whereby the pressure of the water entering the channel is superimposed upon the hydrostatic pressure of the water in the channel as a surface pressure upon the top of the column of water in channel 2. In such a case, the hydrostatic pressure at the bottom portion of the column may be somewhat less than the pressure within the vessel, but the hydrostatic pressure is preferably substantially equal to the pressure of the gas in vessel 4 and the hydrostatic pressure plus the superimposed pressure, herein after referred to as total pressure, is greater than the pressure within the vessel. The level in the liquid outlet conduit may be lower than is described above and the rate of flow therethrough controlled by a valve positioned in the outlet conduit. The purification vessels 19 and 20 may be omitted, and the gas passed through pipe 21 from separator 16 directly to pump cylinder 22. While I have described channel 2 as being formed by bore hole 30, transversed by conduit 7, it is apparent that separate means for confining the two columns of liquid may be employed with appropriate connections with vessel 4.

When in the specification and claims the term hydrostatic pressure is employed, it is intended to refer to the pressure of a column of liquid which is induced by gravity and, when a surface of the liquid is exposed to the atmosphere, by the pressure of the same upon the surface of the liquid.

I claim:

1. The process of treating a gas under high pressure with a liquid which comprises establishing and maintaining a confined column of said liquid having a vertical projection such that a portion of the liquid in the column is under a hydrostatic pressure greater than the pressure of said gas, passing said gas under pressure and regulated quantities of said liquid from said confined column into a vessel positioned adjacent to said portion of the liquid, bringing the liquid and gas into effective contact therein, separately withdrawing from said vessel gas and liquid which have been contacted with each other, the liquid being withdrawn to a bottom portion of a column of said liquid having a vertical projection such that said bottom portion is under a hydrostatic pressure less than but approximating the pressure within the vessel, and withdrawing liquid from the top portion of said column.

2. The process of treating a gas under high pressure with a liquid which comprises establishing and maintaining a confined column of said liquid extending into the earth and having a vertical projection such that a portion of the liquid in the column is under a hydrostatic pressure greater than the pressure of said gas, passing said gas under pressure and regulated quantities of said liquid from said confined column into a vessel positioned below the ground level and adjacent to said portion of the liquid, bringing the liquid and gas into effective contact therein; withdrawing from said vessel gas and liquid which have been contacted with each other, the liquid being withdrawn to a bottom portion of a column of said liquid extending upwardly substantially to the ground level and having a vertical projection such that said bottom portion is under a hydrostatic pressure less than but approximating the pressure within the vessel, and withdrawing liquid from the top portion of said column.

3. The process of treating a gas under high pressure with a liquid which comprises establishing and maintaining a confined column of said liquid under a surface pressure and having a vertical projection such that a portion of the liquid in the column is under a hydrostatic pressure substantially equal to the pressure of said gas and is under a total pressure greater than the pressure of said gas, passing said gas under pressure and regulated quantities of said liquid from said confined column into a vessel positioned adjacent to said portion of the liquid, bringing the liquid and gas into effective contact therein, withdrawing from said vessel gas and liquid which have been contacted with each other, the liquid being withdrawn to a bottom portion of a column of said liquid having a vertical projection such that said bottom portion is under a hydrostatic pressure less than but approximating the pressure within the vessel, and withdrawing liquid from the top portion of said column.

4. The process of removing a gaseous impurity from a gas by solution under pressure of said impurity in a liquid, said gaseous impurity being evolved from solution upon releasing the pressure on the solution, which comprises passing said gas under pressure into a vessel positioned below the ground level, establishing a confined column of said liquid extending into the earth to a point adjacent said vessel and having a vertical projection such that the bottom portion of the column adjacent said vessel is under a pressure greater than the pressure in said vessel, continuously passing liquid from said bottom portion into said vessel and supplying liquid to the top of said column thereby maintaining the aforesaid confined column of liquid, bringing said liquid and gas into effective contact within said vessel to dissolve the aforesaid gaseous impurity in the liquid, withdrawing gas thus treated from said vessel, passing the liquid containing impurity in solution to the bottom portion of a confined column of said liquid and impurity extending upwardly substantially to the ground level and having a vertical projection such that said bottom portion is under a hydrostatic pressure less than but approximating the pressure existing within said vessel, and withdrawing a corresponding amount of liquid and impurity from the top of said column, and controlling the rate with which said liquid passes into and from said vessel by adjusting the pressure of the gas within the vessel.

5. The process of removing a gaseous impurity from a gas by solution under pressure of said impurity in a liquid, said gaseous impurity being evolved from solution upon releasing the pressure on the solution, which comprises passing said gas under pressure into a vessel, establishing a confined column of said liquid extending to a point adjacent said vessel and having a vertical projection such that the bottom portion of the column adjacent said vessel is under a pressure greater than the pressure in said vessel, continuously passing liquid from said bottom portion into said vessel and supplying liquid to the top of said column from a source of said liquid thereby maintaining the aforesaid confined column of liquid, bringing said liquid and gas into effective contact within said vessel to dissolve the gaseous impurity in the liquid, withdrawing gas thus treated from said vessel, passing liquid containing impurity in solution to the bottom portion of a confined column of said liquid and impurity having a vertical projection such that said bottom portion is under a hydrostatic pressure less than but approximating the pressure existing within said vessel, relieving the pressure upon a portion of said solution in said column to cause separation of liquid and gaseous impurity, withdrawing from the top of said column at a point above the aforesaid source liquid separated from said gaseous impurity to a regenerating device, regenerating the liquid and returning the regenerated liquid to said source by gravity.

6. The process of removing $CO_2$ from a gas under pressure by scrubbing with water, which comprises continuously passing said gas under pressure into a vessel positioned below the ground level, passing regulated quantities of water into said vessel from the bottom portion of a confined column of water extending into the earth to a point adjacent said vessel and having a vertical projection such that said bottom portion adjacent said vessel is under a hydrostatic pressure greater than the pressure existing within said vessel, maintaining said column by continuously supplying water to the top portion of the column, bringing said water and gas into effective contact within said vessel whereby $CO_2$ is removed from the gas by solution in the water, withdrawing the gas thus purified from said vessel, forming a confined column of water and $CO_2$ extending upwardly substantially to the ground level and having a vertical projection such that the hydrostatic pressure at the bottom portion of said column is less than but approximating that existing within said vessel, passing regulated quantities of said water containing $CO_2$ in solution from said vessel to the bottom portion of said column and removing corresponding quantities of water and $CO_2$ from the top portion of said column.

7. An apparatus for treating a gas under high pressure with a liquid which comprises a liquid inlet channel of a predetermined vertical projection, a vessel positioned adjacent to the lower part of said channel, means establishing communication between said channel and said vessel, an exit liquid conduit communicating with said vessel and extending upwardly and having substantially the same vertical projection as said channel, and means whereby said gas under pressure may be passed into and through the vessel and may be withdrawn from the vessel after passage therethrough.

8. An apparatus for treating a gas under high pressure with a liquid which comprises a vessel positioned below the ground level, a liquid inlet channel of a predetermined vertical projection extending into the earth to a point adjacent said vessel and communicating therewith, means for admitting regulated quantities of said liquid to the channel, an exit liquid conduit of substantially the same vertical projection as said inlet channel communicating with said vessel and extending upwardly substantially to the ground level, and means whereby said gas under pressure may be passed into and through the vessel and may be withdrawn from the vessel after passage therethrough.

9. An apparatus for treating a gas under pressure with a liquid which comprises a liquid-tight bore hole of predetermined vertical projection extending downwardly into the earth, means for admitting regulated quantities of said liquid to the bore hole, a vessel within said bore hole and substantially at the bottom thereof, said vessel containing means for bringing a liquid and a gas into effective contact with each other, a liquid passage establishing communication between said bore hole and the interior of said vessel, a liquid conduit transversing said bore hole and extending upwardly substantially to the ground level and communicating with the interior of the vessel, and means whereby said gas under pressure may be passed into and through the vessel and may be withdrawn from the vessel after passage therethrough.

10. An apparatus for treating a gas under pressure with a liquid which comprises a liquid-tight bore hole of predetermined vertical projection extending downwardly into the earth, means for admitting regulated quantities of said liquid to the bore hole, a vessel within the bore hole and substantially at the bottom thereof, liquid passages establishing communication between the bore hole and an upper portion of the vessel, a liquid conduit longitudinally transversing said bore hole and extending upwardly substantially to the ground level and communicating with a bottom portion of said vessel, means whereby, said gas under pressure may be passed into a lower portion of and through said vessel and may thereafter be withdrawn from a top portion of the vessel, and means positioned intermediate said upper and lower portions of the vessel whereby said liquid and gas passing therethrough are brought into effective contact with each other.

11. The process of treating a gas under high pressure with a liquid which comprises establishing and maintaining a confined column of said liquid having a vertical projection such that a portion thereof is under a hydrostatic pressure equal to at least a major proportion of the pressure of said gas, passing said gas under pressure and regulated quantities of said liquid from said confined column into a vessel, bringing the liquid and gas into effective contact therein, withdrawing from said vessel gas and liquid which have been contacted with each other, the liquid being withdrawn to a bottom portion of a column of said liquid having a vertical projection such that said bottom portion is under a hydrostatic pressure less than but approximating the pressure within the vessel, and withdrawing liquid from the top portion of said column.

12. The process of treating a gas under high pressure with a liquid which comprises establishing and maintaining a confined column of said liquid having a vertical projection such that a portion of the liquid in the column is under a hydrostatic pressure substantially equal to the pressure of said gas, passing said gas under pressure and regulated quantities of said liquid from said confined column into a vessel positioned adjacent to said portion of the liquid, bringing the liquid and gas into effective contact therein, withdrawing from said vessel gas and liquid which have been contacted with each other, the liquid being withdrawn to a bottom portion of a column of said liquid having a vertical projection such that said bottom portion is under a hydrostatic pressure less than but approximating the pressure within the vessel, and withdrawing liquid from the top portion of said column.

13. The process of removing a gaseous impurity from a gas by solution under pressure of said impurity in the liquid, said gaseous impurity being evolved from solution upon releasing the pressure on the solution, which comprises passing said gas under pressure into a vessel, establishing a confined column of said liquid extending to a point adjacent said vessel and having a vertical projection such that the bottom portion of the column adjacent said vessel is under a hydrostatic pressure substantially equal to the pressure of said gas, continuously passing liquid from said bottom portion into said vessel and supplying liquid to the top of said column from a source of said liquid thereby maintaining the aforesaid confined column of liquid, bringing said liquid and gas into effective contact within said vessel to dissolve the gaseous impurity in the liquid, withdrawing gas thus treated from said vessel, passing liquid containing impurity in solution to the bottom portion of a confined column of said liquid and impurity having a vertical projection such that said bottom portion is under a hydrostatic pressure less than but approximating the pressure existing within said vessel, relieving the pressure upon a portion of said solution in said column to cause separation of liquid and gaseous impurity, withdrawing from the top of said column at a point above the aforesaid source liquid separated from said gaseous impurity to a regenerating device, regenerating the liquid and returning the regenerated liquid to said source by gravity.

14. The process of treating a gas under high pressure with a liquid which comprises establishing and maintaining a confined column of said liquid having a vertical projection such that a portion thereof is under a hydrostatic pressure equal to at least a major proportion of the pressure of said gas, passing said gas under pressure and liquid from said confined column into a vessel, bringing the liquid and gas into effective contact therein and withdrawing from said vessel gas and liquid which have been contacted with each other, the liquid being withdrawn to a bottom portion of a column of said liquid having a vertical projection such that said bottom portion is under a hydrostatic pressure equal to at least a major proportion of the pressure within the vessel.

15. The process of treating a gas under pressure with a liquid which comprises establishing and maintaining a confined column of said liquid having a vertical projection such that a portion thereof is under a hydrostatic pressure equal to at least a major proportion of the pressure of said gas, flowing quantities of said liquid from the confined column into a vessel, passing said gas under pressure into said vessel, bringing the liquid and gas into effective contact therein, withdrawing thus treated gas from the vessel, collecting the liquid after contact with the gas into a pool the surface of which is free to rise and fall with changes in the pressure of the gas within the vessel, passing liquid from said pool to a communicating column of said liquid having a vertical projection above the surface of the pool such that the liquid in the column at the level of the surface of the pool is under a hydrostatic pressure equal to at least a major proportion of the pressure of the aforesaid gas, and withdrawing liquid from the top portion of said column.

16. The process of treating a gas under high pressure with a liquid which comprises establishing and maintaining a confined column of said liquid having a vertical projection such that a portion thereof is under a hydrostatic pressure equal to at least a major proportion of the pressure of said gas, flowing quantities of said liquid from the confined column into a vessel while sealing said column of liquid against backflow of gas therethrough, passing said gas under pressure into said vessel, bringing the liquid and gas into effective contact therein, withdrawing thus treated gas from the vessel, withdrawing liquid after contact with the gas to the bottom portion of a column of said liquid having a vertical projection such that the liquid in said bottom portion of the column is under a hydrostatic pressure equal to at least a major proportion of the pressure of the aforesaid gas, and withdrawing liquid from the top portion of said column.

17. The process of treating a gas under high pressure with a liquid which comprises establishing and maintaining a confined column of said liquid having a vertical projection such that a portion thereof is under a hydrostatic pressure equal to at least a major proportion of the pressure of said gas, flowing quantities of said liquid from the confined column into a vessel while sealing said column of liquid against backflow of gas therethrough, passing said gas under pressure into said vessel, bringing the liquid and gas into effective contact therein, withdrawing thus treated gas from the vessel, collecting the liquid after contact with the gas into a pool the surface of which is free to rise and fall with changes in the pressure of the gas within the vessel, passing liquid from said pool to a communicating column of said liquid having a vertical projection above the surface of the pool such that the liquid in the column at the level of the surface of the pool is under a hydrostatic pressure equal to at least a major proportion of the pressure of the aforesaid gas, and withdrawing liquid from the top portion of said column.

In witness whereof, I hereunto affix my signature.

ARTHUR H. TROTTER.